United States Patent
Cundiff et al.

(10) Patent No.: US 10,931,370 B2
(45) Date of Patent: Feb. 23, 2021

(54) QUANTUM INTERFERENCE DETECTION OF OPTICAL FREQUENCY COMB OFFSET FREQUENCY

(71) Applicant: THE REGENTS OF THE UNIVERSITY OF MICHIGAN, Ann Arbor, MI (US)

(72) Inventors: Steven T. Cundiff, Ann Arbor, MI (US); John Sipe, Toronto (CA); Kai Wang, Ann Arbor, MI (US); Rodrigo Muniz, Toronto (CA)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/611,746

(22) PCT Filed: May 10, 2018

(86) PCT No.: PCT/US2018/032031
§ 371 (c)(1),
(2) Date: Nov. 7, 2019

(87) PCT Pub. No.: WO2018/209060
PCT Pub. Date: Nov. 15, 2018

(65) Prior Publication Data
US 2020/0112366 A1    Apr. 9, 2020

Related U.S. Application Data

(60) Provisional application No. 62/505,285, filed on May 12, 2017.

(51) Int. Cl.
*H04B 10/079* (2013.01)
*H04B 10/29* (2013.01)
(Continued)

(52) U.S. Cl.
CPC .... *H04B 10/0797* (2013.01); *H04B 10/07953* (2013.01); *H04B 10/29* (2013.01); *H04B 10/615* (2013.01); *H04B 10/70* (2013.01)

(58) Field of Classification Search
CPC ....... H04B 10/67; H04B 10/80; H04B 10/079
See application file for complete search history.

(56) References Cited

U.S. PATENT DOCUMENTS

2009/0135859 A1   5/2009  Yu et al.
2011/0235661 A1   9/2011  Grebing et al.
(Continued)

OTHER PUBLICATIONS

Roos et al., "Solid-State Carrier-Envelope Offset Frequency Detection via Quantum Interference in Semiconductors", IEEE, 2004 (Year: 2004).*

(Continued)

*Primary Examiner* — Shi K Li
(74) *Attorney, Agent, or Firm* — Harness, Dickey & Pierce, P.L.C.

(57) ABSTRACT

A method is presented for determining an offset frequency of a frequency comb. The method includes: generating a beam of light with a waveform that repeats regularly in the time domain and exhibits a frequency comb in the frequency domain; directing the beam of light towards a point of incidence on a material; and detecting oscillation of a photocurrent in the material that is caused by the beam of light. Of note, the beam of light has an optical bandwidth that includes light propagating at a first frequency and at a second frequency, where the first frequency is less than the second frequency and the ratio of the second frequency to the first frequency is n:m, where n=m+i, m is an integer greater than one, and n and i are positive integers. Additionally, the material has a band gap and the band gap is not more than n times the first frequency.

24 Claims, 8 Drawing Sheets

(51) Int. Cl.
H04B 10/61 (2013.01)
H04B 10/70 (2013.01)

(56) References Cited

U.S. PATENT DOCUMENTS

2012/0294319 A1 11/2012 Maleki et al.
2014/0185635 A1 7/2014 Cox et al.
2016/0254646 A1 9/2016 Li et al.
2018/0081255 A1* 3/2018 Reimer .................. B82Y 10/00

OTHER PUBLICATIONS

Roos et al, "Characterization of carrier-envelope phase-sensitive photocurrent injection in a semiconductor", Journal of the Optical Society of America B, vol. 22, Issue 2, Feb. 2005 (Year: 2005).*
International Search Report and Written Opinion of the International Searching Authority issued in PCT/US2018/032031, dated Aug. 30, 2018; ISA/KR.
T.M. Fortier et al, "Carrier-Envelope Phase-Controlled Quantum Interference of Injected Photocurrents in Semiconductors". Physical Review Letters, vol. 92, No. 14, Apr. 9, 2004. XP055758136, US, ISSN: 0031-9007, DOI: 10.1103/PhysRevLett.92.147403.
Muniz, Rodrigo A. et al. "Quantum interference control of two— and three-photon processes", 2016 Conference on Lasers and Electro-Optics (CLEO), OSA. Jun. 5, 2016, pp. 1-2, XP033025419, (retrieved on Dec. 16, 2016).
P.A. Roos et al. "Solid-state carrier-envelope phase stabilization via quantum interference control of injected photocurrents," Optics Letters, vol. 30, No. 7. Apr. 1, 2005, pp. 735-737. XP055759038.
Y. Kobayashi, "Optical phase locking among multi-color femtosecond pulses for Fourier synthesis", Lasers and Electro-Optics, 2005. (CLEO). Conference on Baltimore Bay, MD, USA May 22-27, 2005, Piscataway, NJ, USA, IEEE, vol. 3, May 22, 2005 (May 22, 2005), pp. 1623-1625, XP010876984, ISBN: 978-1-55752-795-0.
Wang, Kai et al., "Comb offset frequency measurement using two-photon-three-photon quantum interference control", 2017 Conference on Lasers and Electro-Optics (CLEO). The Optical Society, May 14, 2017 (May 14, 2017), pp. 1-2, XP033238154, DOI: 10.1364/CLEO AT.2017.JTH2A.68 [retrieved on Oct. 25, 2017].

* cited by examiner

QUANTUM INTERFERENCE DETECTION OF OPTICAL FREQUENCY COMB OFFSET FREQUENCY

CROSS-REFERENCE TO RELATED APPLICATIONS

This application is the U.S. National Phase Application under 35 U.S.C. 371 of International Application No. PCT/US2018/032031, filed on May 10, 2018, which claims the benefit of U.S. Provisional Application No. 62/505,285, filed on May 12, 2017. The entire disclosures of the above applications are incorporated herein by reference.

GOVERNMENT CLAUSE

This invention was made with government support under Grant No. N6601-15-1-4050 awarded by NAVY-SPAWAR and Grant No. HR0011516448 awarded by DOD/DARPA. The Government has certain rights in this invention.

FIELD

The present disclosure relates to an improved method for determining offset frequency of an optical frequency comb.

BACKGROUND

Optical frequency combs have had a significant and continuing impact on a range of technologies. They provide the capability to coherently link optical signals separated by arbitrarily large frequency differences and link optical frequencies to radio frequencies. Originally, the excitement about combs was due to their applications in optical frequency metrology, i.e, making absolute measurement of the frequency of light, and the inverse problem of developing optical atomic clocks. However, there has been a steady expansion in their applications. These include the development of dual comb spectroscopy, which can yield higher resolution faster and in smaller package than traditional methods, and coherent communications.

Stabilization and control of the comb offset frequency is essential for mode-locked laser frequency combs. The most common scheme to measure that offset frequency is f-2f self-referencing. One implementation of this is to detect the quantum interference control (QuIC) of the photocurrent that arises from simultaneous single- and two-photon absorption across the gap of a semiconductor. This QuIC self-referencing scheme has been used to measure and stabilize the carrier envelope phase of a Ti:sapphire laser frequency comb. However, this and all other f-2f schemes require a spectrum that spans at least an octave (i.e., a factor two in frequency).

This section provides background information related to the present disclosure which is not necessarily prior art.

SUMMARY

This section provides a general summary of the disclosure, and is not a comprehensive disclosure of its full scope or all of its features.

A method is presented for determining an offset frequency of a frequency comb. The method includes: generating a beam of light with a waveform that repeats regularly in the time domain and exhibits a frequency comb in the frequency domain, where the beam of light has an optical bandwidth that includes light propagating at a first frequency and at a second frequency, such that the first frequency is less than the second frequency and the ratio of the second frequency to the first frequency is n:m, where n=m+i, m is an integer greater than one, and n and i are positive integers; directing the beam of light towards a point of incidence on a material, where the material has a band gap and the band gap is not more than n times the first frequency; and detecting oscillation of a photocurrent in the material that is caused by the beam of light.

In one embodiment, the ratio of the second frequency to the first frequency is n:m, where n=m+1, m is an integer greater than 1 and n is a positive integer. More specifically, the ratio of the second frequency to the first frequency may be 3:2.

The waveform for the beam of light is defined by a series of light pulses in the time domain.

The first beam of light may be generated using a mode-locking laser.

The repetition rate of the beam of light may be within a range of 10 megahertz to 10 gigahertz.

The material is further defined as one of a semiconductor or an insulator.

In some instances, the material has a bandgap that is greater than two times the first frequency but less than three times the first frequency.

Oscillation of a photocurrent may be detected by measuring a frequency of the oscillation of the photocurrent, for example using electrodes disposed on a surface of the material.

In some embodiments, oscillation of a photocurrent flows transverse to propagation direction of light through the material. The material is arranged such that the beam of light does not propagate along a symmetry axis of the material.

In other embodiments, oscillation of a photocurrent flows parallel to propagation direction of light through the material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
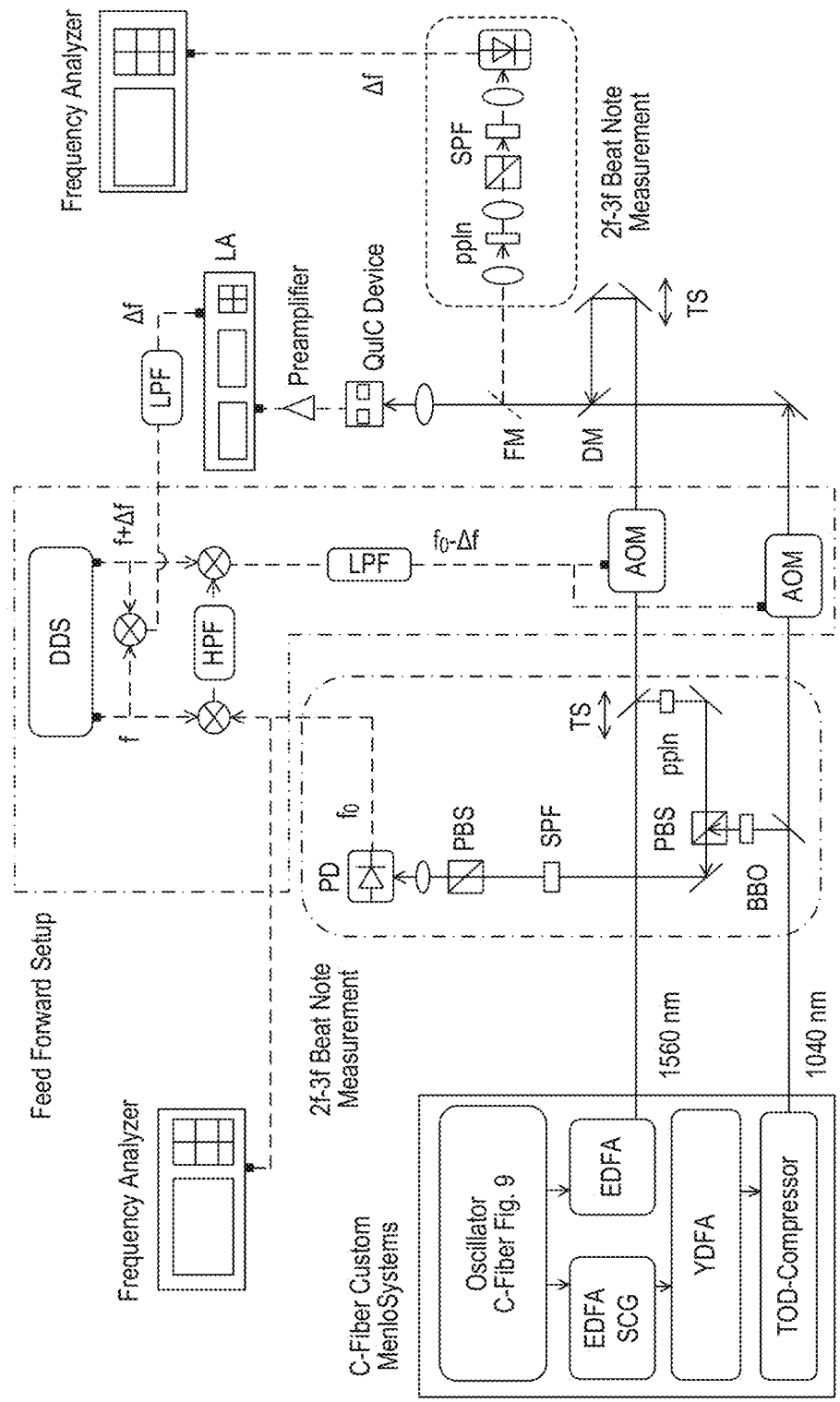
Figure 7A:
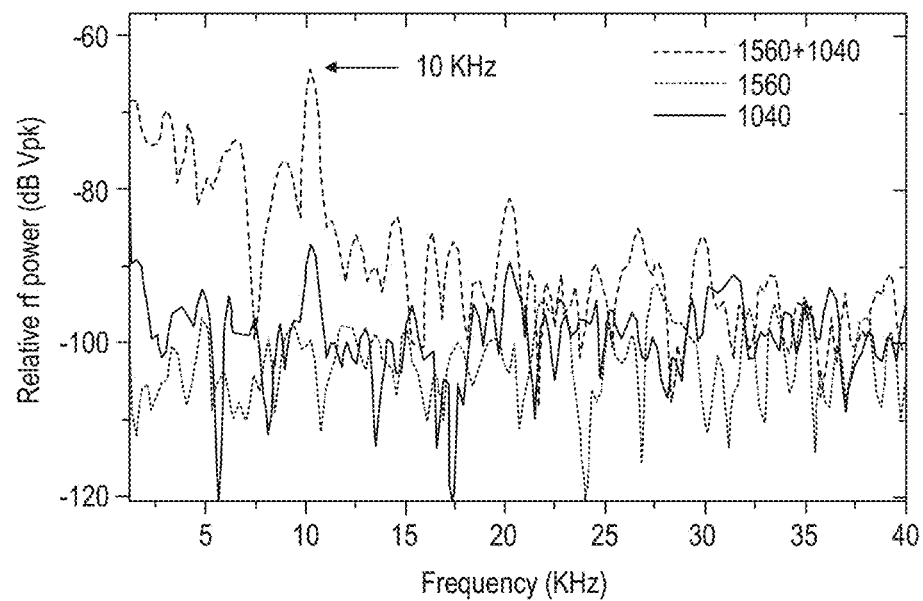
Figure 7B:
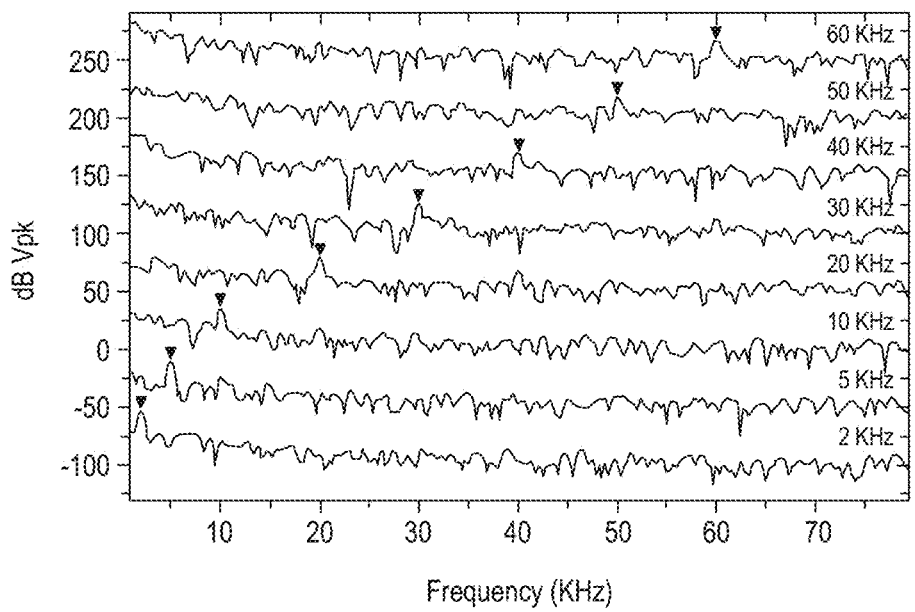

FIG. 6 is a diagram of an experimental setup used to demonstrate the proposed method for determining the offset frequency of a frequency comb, where DDS: Direct Digital Synthesizer; DM: Dichroic Mirror; EDFA: Erbium-doped Fiber Amplifier; f0 is comb offset frequency; FM: Folding Mirror; HPF: High Pass Filter; LA: Lock-in Amplifier; LPF:

Low Pass Filter; PBS: Polarizing Beam Splitter; PD: Photodiode; SCG: Super-continuum Generation; SPF: Short Pass Filter; TS: Translation Stage; and YDFA: Ytterbium-Doped Fiber Amplifier;

FIG. 7A is a graph illustrating the RF frequency spectrum of the quantum interference control current induced by a 1040 nm beam only, a 1560 nm beam only and both 1560 nm and 1040 nm beams unblocked; and FIG. 7B is a graph illustrating the frequency spectrum when the offset frequency is varied from 2 kHz to 60 kHz.

Corresponding reference numerals indicate corresponding parts throughout the several views of the drawings.

DETAILED DESCRIPTION

Example embodiments will now be described more fully with reference to the accompanying drawings.

Figure 1:
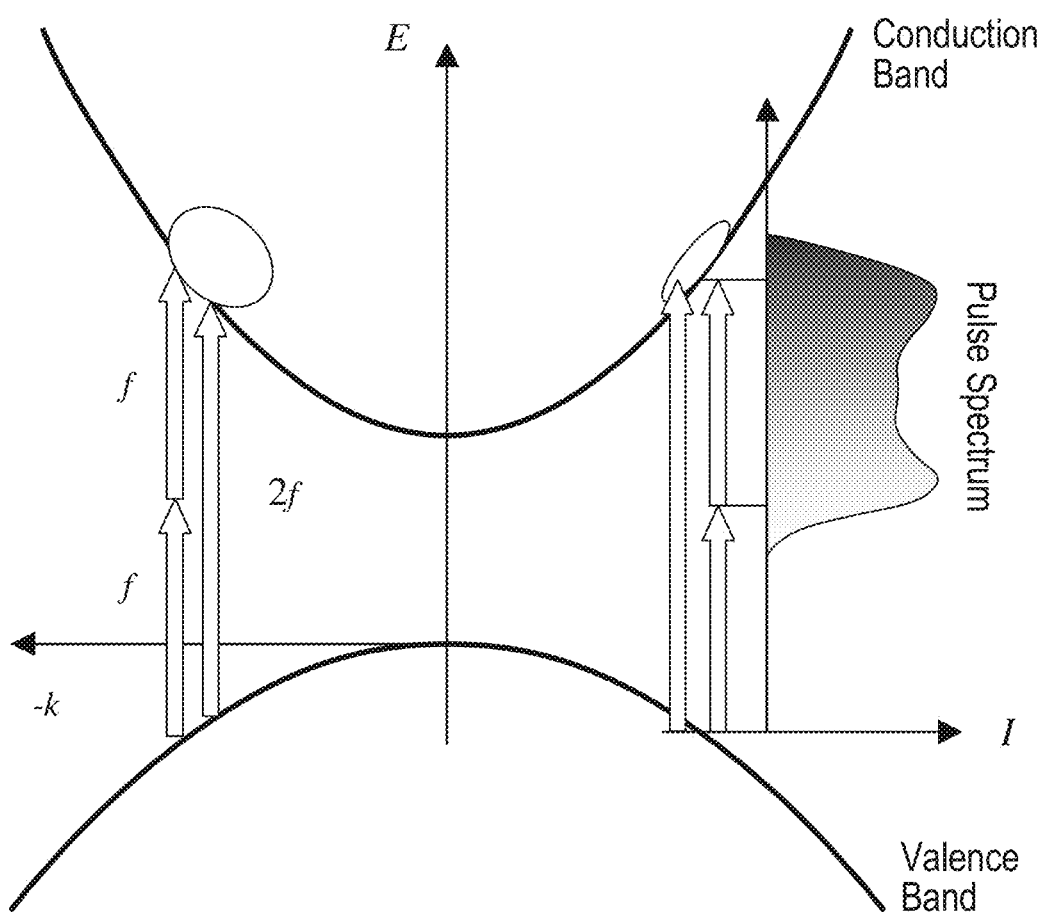
FIG. 1 is a schematic of quantum interference control process using one-photon and two-photon absorption.

By way of background, determining an offset frequency of a frequency comb can be achieved using quantum interference control (QuIC) of injected photocurrents. In this approach, photocarriers are generated in the conduction band of a semiconductor simultaneously by one-photon and two-photon absorption as seen in FIG. 1. The quantum interference of these two pathways depends on both the momentum of the electrons and the relative phase of the light. The net effect is a phase dependent imbalance of the electron distribution in momentum space, which is equivalent to a phase-dependent photocurrent. The photocurrent exists even in the absence of a bias, thus it is directly injected by the QuIC process. Specifically, the current injection rate for an octave spanning pulse is $j=E_f^2 E_{2f} \sin(\phi_{CE})$ where $E_f(E_{2f})$ is the electric field of the light at frequency f(2f) and $\phi_{CE}$ is the carrier envelope phase of the pulse. For a train of pulses with evolving carrier-envelope phase, the current will oscillate at the offset frequency of the corresponding comb.

In this disclosure, a new two-photon-three-photon (2p-3p) self-referencing QuIC scheme is proposed to measure the comb offset frequency. It is based on the photocurrent induced by the quantum interference of two- and three-photon absorption processes. One advantage of this scheme is that the bandwidth required is reduced similar to optical 2f-3f self-referencing. Moreover, in contrast to the one-photon-two-photon QuIC scheme, where the absorption lengths of two fields mismatch due to the strong above-band gap single photon absorption of light at 2f, in 2p-3p QuIC, the absorption lengths of both f and 3/2 f fields are more than tens of microns because the photon energies of both light fields are below the band-gap energy. Single photon absorption is thus greatly suppressed, allowing the design of integrated devices using waveguides.

Figure 2:
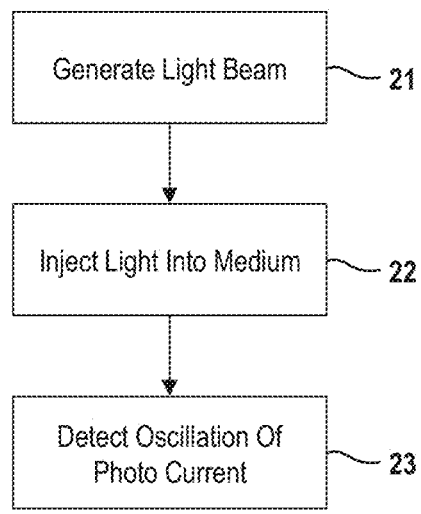
FIG. 2 is flowchart illustrating an improved method for determining an offset frequency of a frequency comb.

FIG. 2 further illustrates this proposed method for determining an offset frequency of a frequency comb. A beam of light is generated at 21 with a waveform that repeats regularly in the time domain and exhibits a frequency comb in the frequency domain. In one embodiment, the waveform for the beam of light is defined by a series of light pulses in the time domain. The repetition rate for the pulses is preferably within a range of 10 megahertz and 10 gigahertz. Of note, the beam of light has a sufficiently large optical bandwidth such that the beam includes light propagating at a first frequency and light propagating at a second frequency, where the first frequency is less than the second frequency.

Stated generally, the ratio of the second frequency to the first frequency is n:m, where n=m+i, m is an integer greater than one, and n and i are positive integers. In one embodiment, the ratio of the second frequency to the first frequency can be n:m, where n=m+1, m is an integer greater than one and n is a positive integer. In another embodiment, the ratio of the second frequency to the first frequency is substantially 3:2 (or 1.5). For example, the beam of light may include light a 1040 nm and 1560 nm. These values are merely illustrative and not intended to be limiting. Other ratio are contemplated within the general rule.

The beam of light is directed towards (and incident upon) a sample as indicated at 22. The sample is comprised of a material having a band gap and the band gap is not more than n times the first frequency. More specifically, the band gap of the material is preferably greater than two times the first frequency but less than three times the first frequency. In the case of the first frequency corresponds to light with a wavelength of 1040 nm, the sample may be comprised of aluminum gallium arsenide which has a band gap of 1.912 eV (648.4 nm). That is, the band gap is not more than three times the first frequency. Again, these values are merely illustrative and not intended to be limiting. Depending on the application, it is understood that different types of materials, including semiconductors and insulators may be used.

The beam of light causes a photocurrent in the sample. Oscillation of the photocurrent is detected at 23. Different detection methods are contemplated by this disclosure. For example, the frequency of the oscillation of the photocurrent may be measured electrically using electrodes placed on the surface of the sample.

In another example, radiation caused by the photocurrent may be detected and provide an indication of the frequency of the oscillations. The injection of a current by the quantum interference process is equivalent to the rapid acceleration of electrons in the material. A fundamental result of electromagnetic theory is that accelerating charges (here electrons) radiate electromagnetic waves. Thus the injection of a current by quantum interference results in the radiation of electromagnetic waves. The frequency of these waves are determined by the timescale over which the current accelerates. For a single pulse, this time scale is sub-picosecond, the radiation is at terahertz frequencies but with very large bandwidth, which has been detected. However, the cumulative effect of many pulses (or repetitions of the waveform) will be to enhance the component of the radiated electromagnetic wave to the comb offset frequencies, and integer multiples of it. In any case, the frequency of the oscillations corresponds to the offset frequency of a frequency comb exhibited by the excitation beam of light.

Figure 3:
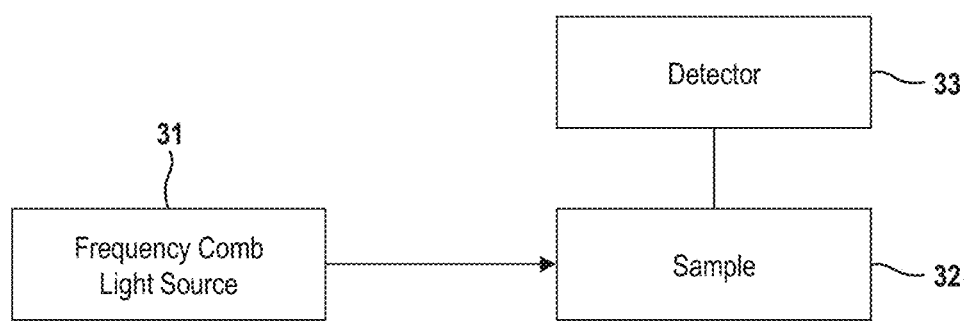
FIG. 3 is a diagram of a system for determining an offset frequency of a frequency comb exhibited by an excitation beam of light.

FIG. 3 depicts a system 30 for determining an offset frequency of a frequency comb exhibited by an excitation beam of light. The system 30 is comprised generally of a frequency comb light source 31, a sample 32 and a detector 33. It is to be understood that only the relevant components are discussed in relation to FIG. 3, but that other components may be needed to implement the overall system.

In an example embodiment, the frequency comb light source 31 is a fiber-based femtosecond laser source that employs a nonlinear optical loop mirror mode locking mechanism. For further details regarding an exemplary femtosecond laser source, reference may be had to the C-Fiber femtosecond fiber laser commercially available from Menlo Systems. It is readily understood that other arrangements of light sources and modulators may be used to implement a frequency comb light source and fall within the scope of this disclosure.

The beam of light generated by the frequency comb light source 31 is directed towards a point of incidence on a sample. Different waveguide arrangements may be used as shown in FIGS. 4A-4D. In these examples, the point of incidence 41 is on one end of an elongated waveguide 40.

Figure 4A:
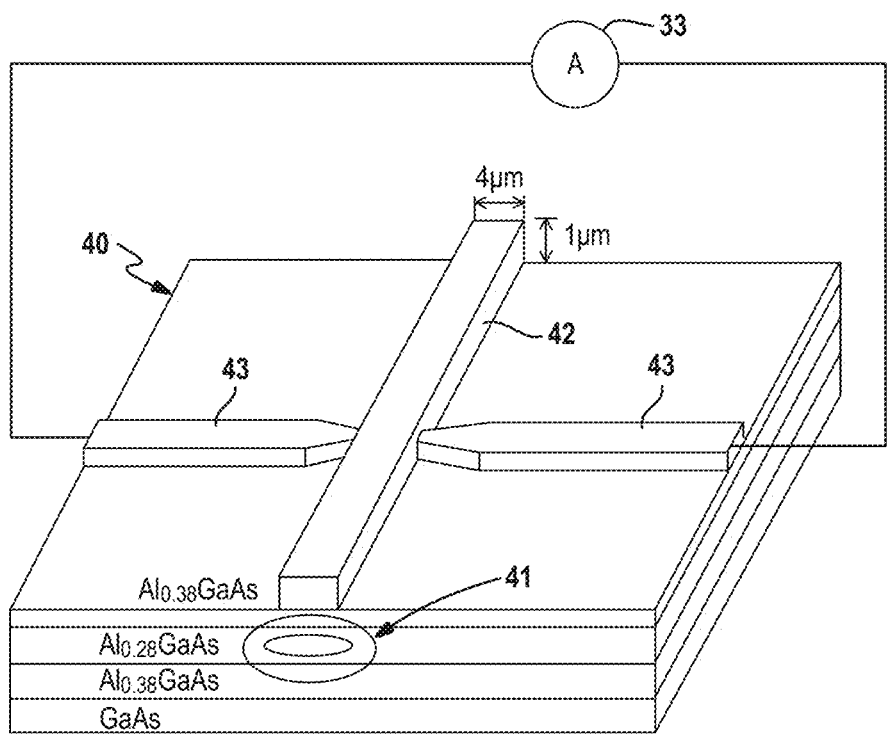
FIGS. 4A-4E are diagrams illustrating different arrangements in which the photocurrent flows perpendicular to propagation direction of the light through the material.
Figure 4B:
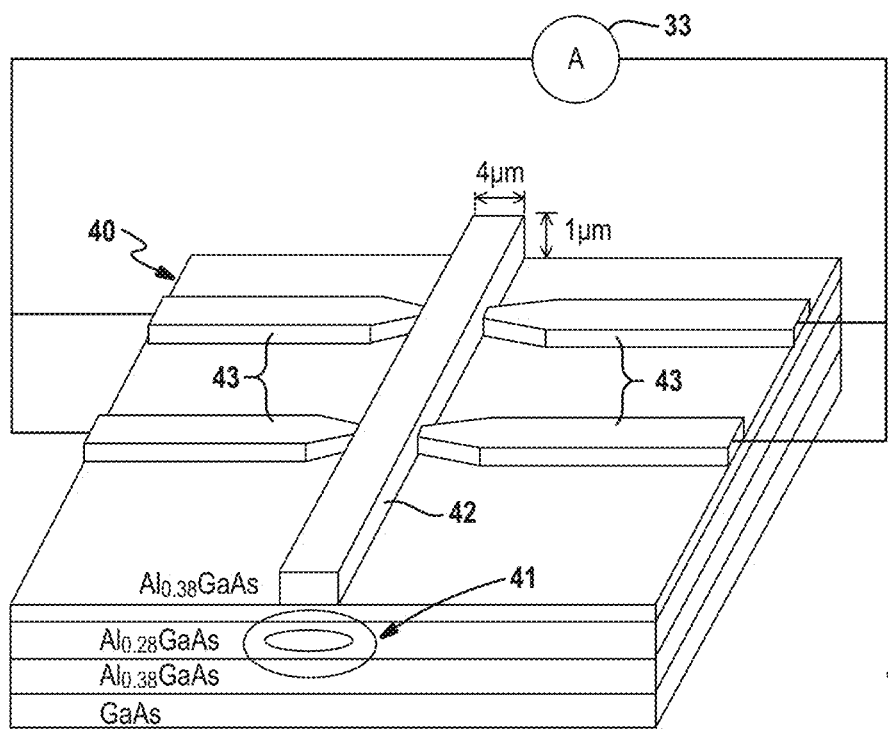
Figure 4C:
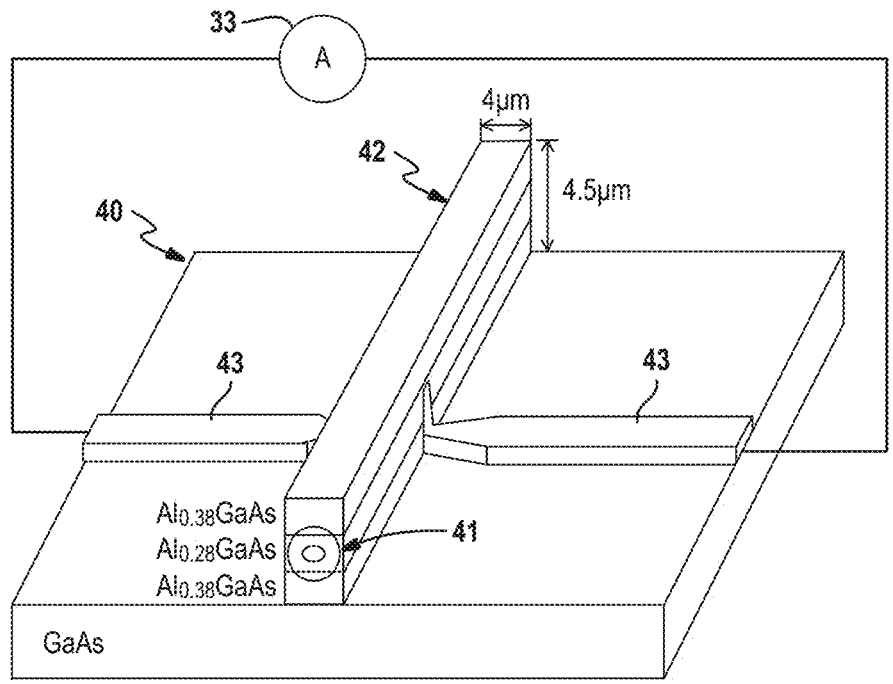
Figure 4D:
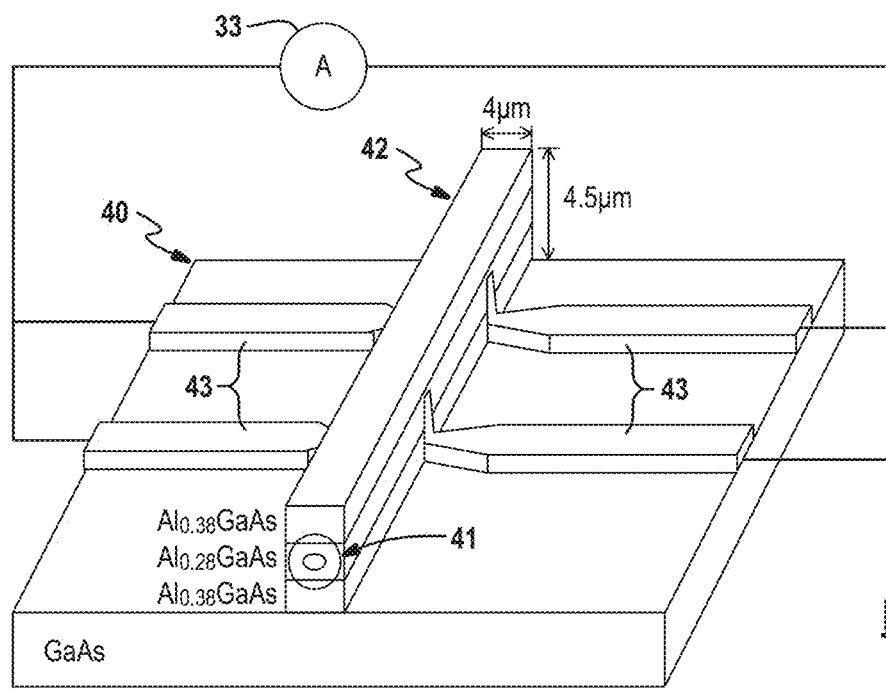

The waveguide 40 is comprised of layers of aluminum gallium arsenide supported on top of a layer of gallium arsenide. In FIGS. 4A and 4B, a rail 42 is integrally formed from the top layer of aluminum gallium arsenide and protrudes upward from the top surface of the waveguide. In FIG. 4A, two electrodes 43 are formed on the top surface of the waveguide 40; whereas, in FIG. 4B two pairs of electrodes are formed on the top surface of the waveguide. In FIGS. 4C and 4D, the rail 42 is formed by multiple layers of aluminum gallium arsenide which are deposited on top of the layer of gallium arsenide. In FIG. 4C, two electrodes 43 are formed on the exposed top surface of the layer of gallium arsenide; whereas, in FIG. 4D, two pairs of electrodes are formed on the exposed top surface of the layer of gallium arsenide. Other arrangements for the electrodes are contemplated by this disclosure.

In operation, the light incident thereon propagates in the direction of the rail 42 from one end of the waveguide to the other end of the waveguide. The photocurrent caused by the light flow between two adjacent electrodes 43. That is, the photocurrent flows transverse to the propagation direction of light through the sample. To detect oscillation of the photocurrent, a detector 33 is electrically coupled to the electrodes 43. In one embodiment, the detector 33 is a lock-in amplifier.

Figure 4E:
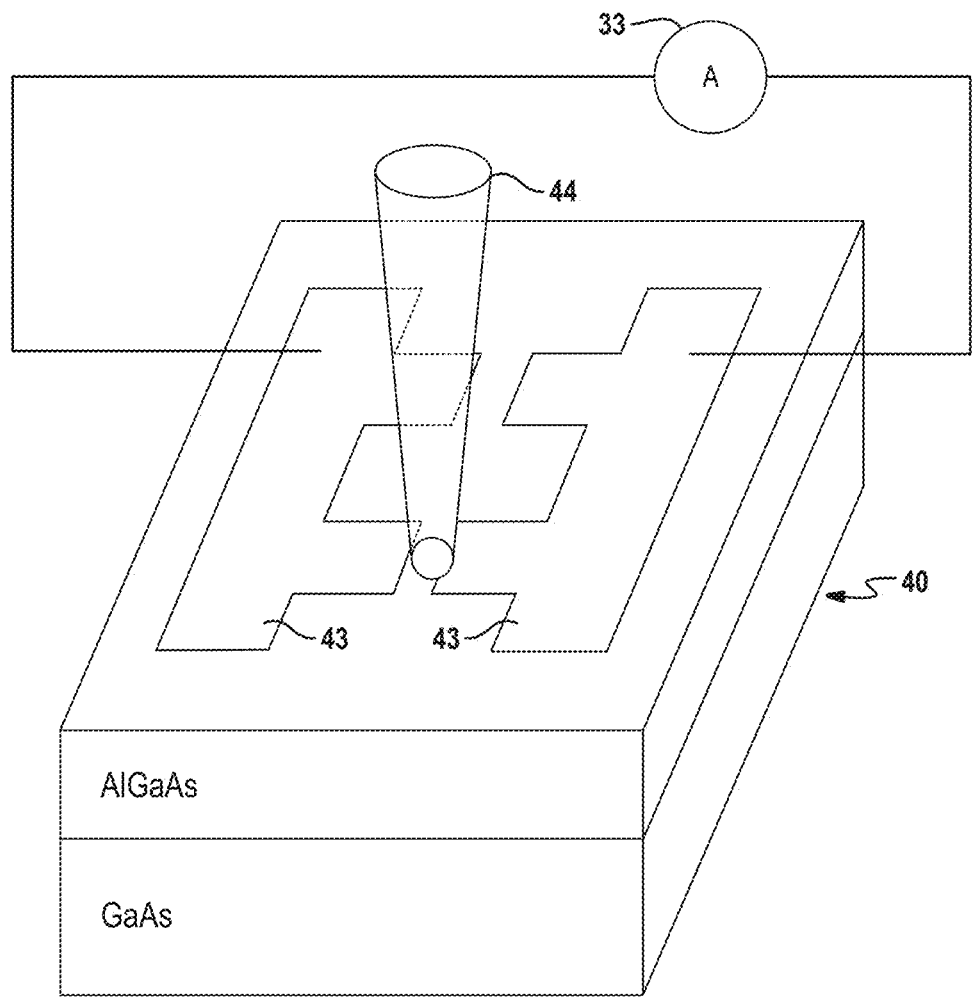

FIG. 4E is another arrangement where photocurrent flows transverse to the propagation direction of light through the sample. In this example, electrodes 43 are placed on the top surface of a material and the light 44 is incident from above the surface. In particular, the light 44 is incident between the two electrodes 43 that are placed on the surface of the material. The material may be a uniform bulk sample with the properties described in 017, or it may have a layer with tailored properties as shown in FIG. 4E. The photocurrent flows between the electrode and thus is transverse to the downward propagation direction of the light in the sample. To detect oscillation of the photocurrent, a detector 33 is electrically coupled to the electrodes 43.

Figure 5:
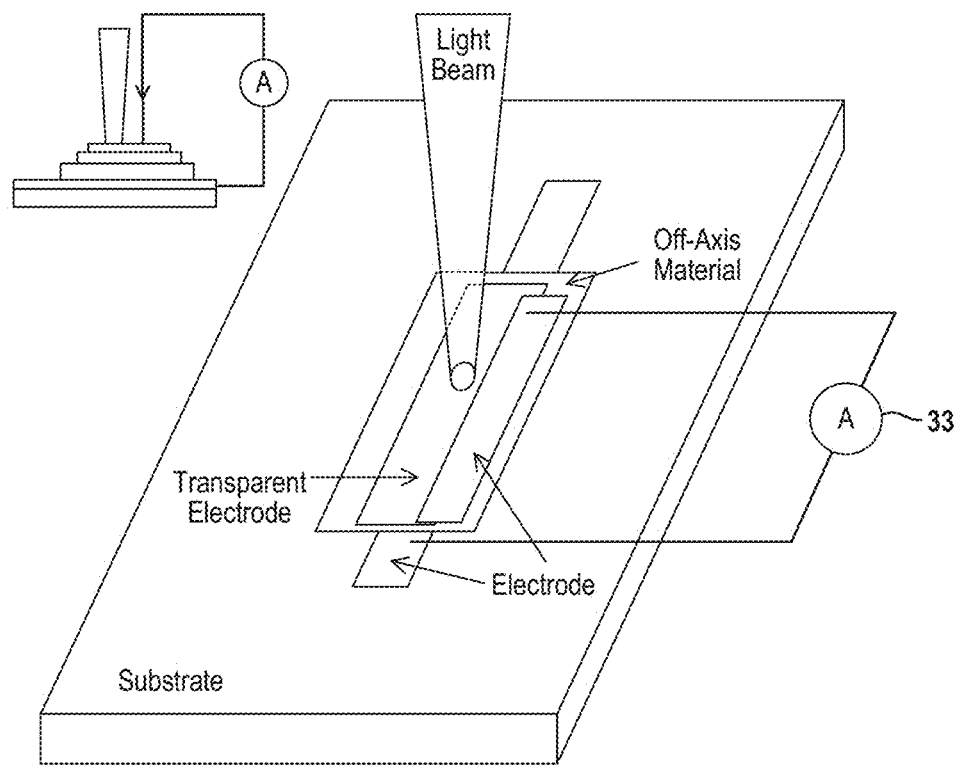
FIG. 5 is a diagram of an arrangement in which the photocurrent flows parallel to propagation direction of light through the material.

FIG. 5 is a variation in which the photocurrent flows parallel to the propagation direction of light through the sample. The electric field vector (polarization) of the incidence light is always transverse to the direction of propagation. If the polarization is along a symmetry axis of the material, the induced current flows parallel to the polarization, and hence transverse to the propagation direction. However, if the polarization direction is not parallel to a symmetry axis, the current flow will not necessarily be parallel to it, and can have a component in the direction of the propagation. The optimum direction is when the polarization is oriented at 45 degrees with respect the 3 symmetry axes, although some parallel current will occur for any deviation from alignment along a symmetry axis. Because the light is always incident a surface, the most common way of achieving these conditions is through the cut of the crystal, i.e., how the surface is oriented with respect to the crystal lattice. The optimum case is known as a "111" cut.

In this example, beam of light is incident on a top surface of the sample. When the sample material is arranged such that beam of light does not propagate along a symmetry axis or plane of the material, a resulting photocurrent flows parallel to the propagation direction of light. That is, the photocurrent flows from top to bottom. Likewise, electrodes 43 are arranged on top of the sample material and underneath the sample material. These are merely a few exemplary arrangements which may be used in the proposed system.

FIG. 6 depicts an experimental setup. The laser system is a custom C-Fiber laser system commercially available from Menlo Systems. The laser outputs two femtosecond pulse trains at different wavelengths: one (400 mW) is centered at 1560 nm, and the other (740 mW) is centered at 1040 nm. The pulse duration is about 70 fs for both beams, and the repetition rate is 250 MHz. The offset frequency of the laser comb was measured optically using the heterodyne beat note produced in a 2f-3f self-referencing interferometer, in which the frequency of 1040 nm beam was doubled with a BBO crystal and the 1560 nm beam was tripled with a PPLN crystal (the PPLN is designed for second harmonic generation but it also produces weak third harmonic). The linewidth of the 2f-3f beat note is around 400 KHz. A feed-forward technique is used to reset the offset frequency with a narrower linewidth. The feed-forward setup also enables one to control the offset frequency.

The light is then focused onto an AlGaAs device between two gold electrodes separated by around 10 μm. Both field polarizations are oriented along the [010] crystal axis. The current is detected in the [010] direction by the electrodes. The device is made from epitaxially grown AlGaAs on a GaAs substrate. The bandgap of AlGaAs is at a wavelength <700 nm, thereby suppressing the linear absorption of 1040 nm and two photon absorption of 1560 nm. Photocurrents are injected in AlGaAs by quantum interference between two photon absorption of 1040 nm beam and three photon absorption of 1560 nm beam.

FIG. 7A shows the frequency spectrum of the induced photocurrent in AlGaAs for three different conditions: blocking the 1560 nm beam, blocking the 1040 nm beam, and with both the 1040 nm beam and 1560 nm beam unblocked. The QuIC signal in the semiconductor behaves as a current source rather than a voltage source; the observed photocurrent signal is 2 nA, with a 15 dB signal-to-noise ratio in a 30 KHz bandwidth. The same signal measured using lock-in detection is greater than 0.3 mV (using a 150 kΩ load resistor) and with an average power (spot size) at 1040 nm of 7 mW (4.11±0.4 μm, FWHM) and 1560 nm of 30 mW (3.16±0.3 μm, FWHM), respectively. An additional degree of freedom that can be manipulated is the CEO frequency, which is controlled by the feed-forward setup. By varying the CEO frequency from 2 KHz to 60 KHz, one can observe the change of the beat note in the spectrum.

In summary, the quantum interference control of injected photocurrent due to interfering two- and three-photon absorption processes was detected in AlGaAs. Using this QuIC photocurrent, the carrier-offset frequency of a fiber laser frequency comb was measured. This scheme is promising since the bandwidth required is reduced, and waveguide detection in integrated structures should lead to more compact devices for comb offset. It is envisioned that this technique may be employed to implement a direct on-chip digital optical synthesizer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for determining an offset frequency of a frequency comb, comprising:
    generating a beam of light with a waveform that repeats regularly in the time domain and exhibits a frequency comb in the frequency domain, wherein the beam of light has an optical bandwidth that includes light propagating at a first frequency and at a second frequency, such that the first frequency is less than the second frequency and the ratio of the second frequency to the first frequency is n:m, where n=m+1, m is an integer greater than one and n is a positive integer;
    directing the beam of light towards a point of incidence on a material, where the material has a band gap and the band gap is greater than m times the first frequency but less than n times the first frequency;
    detecting oscillation of a photocurrent in the material that is caused by the beam of light.

2. The method of claim 1 wherein the waveform for the beam of light is defined by a series of light pulses in the time domain.

3. The method of claim 1 further comprises generating the first beam of light using a mode-locking laser.

4. The method of claim 1 wherein the repetition rate of the beam of light is within a range of 10 megahertz to 10 gigahertz.

5. The method of claim 1 wherein the material is further defined as one of a semiconductor or an insulator.

6. The method of claim 1 further comprises detecting oscillation of a photocurrent by measuring a frequency of the oscillation of the photocurrent.

7. The method of claim 6 further comprises detecting oscillation of the photocurrent using electrodes disposed on a surface of the material.

8. The method of claim 1 further comprises detecting oscillation of a photocurrent that flows transverse to propagation direction of light through the material.

9. The method of claim 1 wherein detecting oscillation of the photocurrent further arranging the material such that the beam of light does not propagate along a symmetry axis of the material.

10. The method of claim 9 further comprises detecting oscillation of a photocurrent that flows parallel to propagation direction of light through the material.

11. The method of claim 1 further comprises amplifying at least one of the light at the first frequency and the light at the second frequency in the beam of light before the beam of light is incident on the material.

12. The method of claim 1 further comprises filtering out at least one of the light at the first frequency and the light at the second frequency from the beam of light before the beam of light is incident on the material.

13. A method for determining an offset frequency of a frequency comb, comprising:
    generating a beam of light with a waveform that repeats regularly in the time domain and exhibits a frequency comb in the frequency domain, wherein the beam of light has an optical bandwidth that includes light propagating at a first frequency and at a second frequency, such that the first frequency is less than the second frequency and the ratio of the second frequency to the first frequency is n:m, where n=m+i, m is an integer greater than one, and n and i are positive integers;
    directing the beam of light towards a point of incidence on a material, where the material has a band gap and the band gap is greater than m times the first frequency but less than n times the first frequency; and
    detecting oscillation of a photocurrent in the material that is caused by the beam of light.

14. The method of claim 13 wherein the waveform for the beam of light is defined by a series of light pulses in the time domain.

15. The method of claim 13 further comprises generating the first beam of light using a mode-locking laser.

16. The method of claim 13 wherein the repetition rate of the beam of light is within a range of 10 megahertz to 10 gigahertz.

17. The method of claim 13 wherein the material is further defined as one of a semiconductor or an insulator.

18. The method of claim 13 further comprises detecting oscillation of a photocurrent by measuring a frequency of the oscillation of the photocurrent.

19. The method of claim 18 further comprises detecting oscillation of the photocurrent using electrodes disposed on a surface of the material.

20. The method of claim 13 further comprises detecting oscillation of a photocurrent that flows transverse to propagation direction of light through the material.

21. The method of claim 13 wherein detecting oscillation of the photocurrent further arranging the material such that the beam of light does not propagate along a symmetry axis of the material.

22. The method of claim 21 further comprises detecting oscillation of a photocurrent that flows parallel to propagation direction of light through the material.

23. The method of claim 13 further comprises amplifying at least one of the light at the first frequency and the light at the second frequency in the beam of light before the beam of light is incident on the material.

24. The method of claim 13 further comprises filtering out at least one of the light at the first frequency and the light at the second frequency from the beam of light before the beam of light is incident on the material.

\* \* \* \* \*